(No Model.)
M. FREEMAN.
SEED SOWER.
No. 364,005. Patented May 31, 1887.
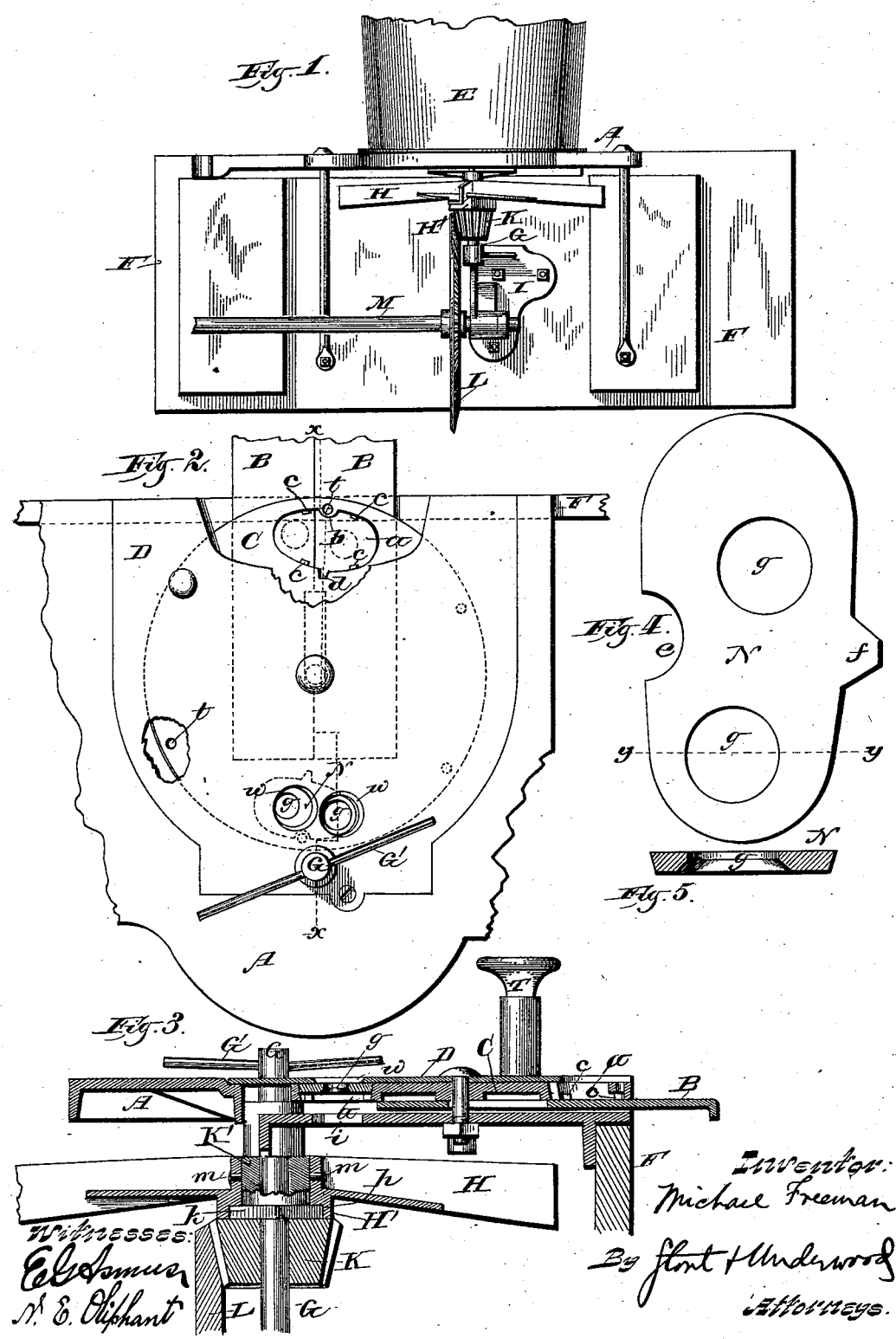

UNITED STATES PATENT OFFICE.

MICHAEL FREEMAN, OF RACINE, WISCONSIN.

SEED-SOWER.

SPECIFICATION forming part of Letters Patent No. 364,005, dated May 31, 1887.

Application filed March 30, 1887. Serial No. 232,938. (No model.)

*To all whom it may concern:*

Be it known that I, MICHAEL FREEMAN, of Racine, in the county of Racine, and in the State of Wisconsin, have invented certain new and useful Improvements in Seed-Sowers; and I do hereby declare that the following is a full, clear, and exact description thereof.

My invention relates to seed-sowers; and it consists in certain peculiarities of construction and combination of parts, to be hereinafter described with reference to the accompanying drawings, and subsequently claimed.

In the drawings, Figure 1 represents a rear elevation of my improved seed-sower; Fig. 2, a plan view of the same with the hopper removed; Fig. 3, a section taken on line $x\,x$, Fig. 2; Fig. 4, a detail; and Fig. 5, a section on line $y\,y$, Fig. 4.

Referring by letter to the drawings, A represents the floor; B, the cut-off plates; C, a rotary adjustable disk; D, the top plate; E, the hopper; F, the vertical board, to which said floor is attached; G, the distributer-shaft, provided with a stirring-pin, G'; H, the distributer; and I is a bracket provided with a bearing for said distributer-shaft and for a shaft, M, that carries the bevel gear-wheel L, which latter meshes with a pinion, K, that is secured to the part H.

With the exception of the disk C, distributer H, and pinion K, the several parts above mentioned correspond in their general construction and relative arrangement to similar parts shown and more particularly set forth in Letters Patent No. 340,744, dated April 27, 1886.

Instead of providing the disk C with a series of graduated openings arranged in pairs, as in the patent above referred to, I cast said disk with one, two, or more elongated openings, $a$, all of which have a uniform contour. These elongated openings are arranged around near the periphery of the disk, and each one of said openings is preferably of greater width at one end than at the other. Projecting into each opening $a$ is an ear, $b$, and lugs $c$, and opposite the ear the disk is provided with a recess, $d$, that communicates with said opening.

The opening or openings $a$ in the disk C serve as seats for removable plates N, that correspond in contour with said openings, and are severally provided with a recess, $e$, and lug $f$, to respectively engage the ears $b$ and recesses $d$ of said disk.

By having the plates N and opening $a$ in the disk C wider at one end than at the other the operator is compelled to place said plates right side up, and this placing of the plates is facilitated by the recess $e$ and lug $f$ thereof registering with the ear $b$ and recess $d$ of said disk.

When the plates N are in place in the disk C, they rest upon the lugs $c$, that project from the latter into the openings $a$, and the upper faces of said plates and disk are flush with each other. In order to secure a close joint between the plates N and the disk C, I prefer to bevel the opposing edges of said plates and the openings $a$ of said disk in opposite directions.

Each removable plate is provided with a pair of openings, $g$, and the area of the openings in one plate is greater or less, as may be, than that of the openings in all the other plates.

The openings in the plates are graduated to regulate the amount of seed of various kinds desirable to be sown to an acre of ground, and the disk C is rotated so as to bring the openings in any one of said plates into line with the seed-openings $w\,w$ in the top plate, D, and the opening $i$ in the floor A of the machine.

In order to more readily deliver the seed to the distributer, I prefer to enlarge the lower portions of the respective openings $g$ in the plates N, as best illustrated by Fig. 5.

As in the patent above referred to, I provide the disk C with a series of perforations, $t$, to engage a spring-dog, T, whereby said disk is held in the position to which it may be adjusted.

The above-described construction of the disk C, in connection with the plates N, enables me to cheapen the manufacture of this class of machines, and at the same time render unnecessary the removal of one disk to substitute another therefor.

Any number of the plates N may accompany the machine, each plate having the openings $g$ therein of a size suitable for a certain variety of seed, and it is only a momentary operation to remove one plate and substitute another. If found desirable, the plates may be provided with suitable marks or letters denoting the variety of seed to which each one is adapted.

Heretofore it has been usual to cast the pinion K integral with the distributer H and of the same metal therewith. This construction is objectionable, for the reason that the distributer (of which the pinion forms a part) is ordinary cast-iron, and in case the pinion becomes broken the entire distributer is rendered worthless.

In the present construction I provide the distributer below its central opening with a depending portion, H', that has a square socket, h, as best illustrated in Fig. 3.

The pinion K is separate from the distributer, and is preferably of steel. Forming part of and vertically extending from the pinion in an upward direction to engage the central opening in the distributer is a central stud, K', that is provided with a square shoulder, k, to engage the socket h in the depending portion H' of said distributer.

In order to hold the pinion in place against vertical displacement, I key the same by means of pins m, as shown by Fig. 3.

Having thus fully described my invention, what I claim as new, and desire to secure by Letters Patent, is—

1. In a sower, the combination of a rotary adjustable disk provided with a suitable opening, a series of removable plates that severally correspond in contour with said opening and are of themselves provided with an opening or openings, substantially as and for the purpose set forth.

2. In a sower, the combination of a rotary adjustable disk provided with two or more openings of uniform contour, removable plates that severally correspond in contour with said disk-openings and are of themselves provided with an opening or openings, and a mechanism for retaining the disk in its adjusted position, substantially as and for the purpose set forth.

3. In a sower, the combination of a rotary adjustable disk provided with one, two, or more openings that have a uniform contour, but are wider at one end than the other, removable plates that severally correspond in contour with said openings and are of themselves provided with an opening or openings, and a suitable mechanism for retaining the disk in its adjusted position, substantially as set forth.

4. In a sower, the combination of a rotary adjustable disk provided with one, two, or more openings having a uniform contour, an ear projecting into each opening, and a recess communicating with the latter, removable plates that severally correspond in contour with said openings and are of themselves provided with an opening or openings, a recess and a lug, and a mechanism for retaining the disk in its adjusted position.

5. In a sower, the combination of a rotary adjustable disk provided with one, two, or more openings that have a uniform contour, lugs projecting into each opening, removable plates that severally correspond in contour with said openings and are of themselves provided with an opening or openings, and a suitable mechanism for retaining the disk in its adjusted position, substantially as and for the purpose set forth.

6. In a sower, the combination of a rotary adjustable disk provided with a suitable opening, removable plates that severally correspond in contour with said disk-opening and are of themselves provided with an opening or openings, the lower portions of which are enlarged, and a mechanism for retaining the disk in its adjusted position, substantially as and for the purpose set forth.

7. In a sower, the distributer thereof provided with a detachable pinion, substantially as and for the purpose set forth.

8. In a sower, the distributer thereof provided with a square socket and a detachable pinion having a square shoulder to engage said socket, substantially as and for the purpose set forth.

9. In a sower, the combination of a rotary adjustable disk provided with one, two, or more openings that have a uniform contour and are beveled upon their edges, removable plates that severally correspond in contour with said openings and are of themselves provided with an opening or openings, and have their edges beveled in opposition to the bevel of said disk-openings, and a suitable mechanism for retaining the disk in its adjusted position, substantially as and for the purpose set forth.

In testimony that I claim the foregoing I have hereunto set my hand, at Racine, in the county of Racine and State of Wisconsin, in the presence of two witnesses.

MICHAEL FREEMAN.

Witnesses:
STEPHEN FREEMAN,
S. S. STOUT.